US012573575B2

(12) United States Patent
Douglass et al.

(10) Patent No.: US 12,573,575 B2
(45) Date of Patent: Mar. 10, 2026

(54) FUSE WITH ENCAPSULATED ARC QUENCHING MATERIAL

(71) Applicant: Eaton Intelligent Power Limited, Dublin (IE)

(72) Inventors: Robert Stephen Douglass, Wildwood, MO (US); Gautam Sharma, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 99 days.

(21) Appl. No.: 18/295,073

(22) Filed: Apr. 3, 2023

(65) Prior Publication Data

US 2024/0331964 A1 Oct. 3, 2024

(51) Int. Cl.
*H01H 85/38* (2006.01)
*H01H 85/04* (2006.01)
*H01H 85/165* (2006.01)

(52) U.S. Cl.
CPC .......... *H01H 85/165* (2013.01); *H01H 85/04* (2013.01); *H01H 85/38* (2013.01)

(58) Field of Classification Search
CPC ...... H01H 85/04; H01H 85/165; H01H 85/38; H01H 85/40–42; H01H 2085/381–388
See application file for complete search history.

(56) References Cited

U.S. PATENT DOCUMENTS 3,710,295 A 1/1973 Staub
3,733,572 A * 5/1973 Mikulecky ........... H01H 85/042 337/159
3,851,290 A 11/1974 Stover
3,949,342 A * 4/1976 Kozacka ................ H01H 85/42 337/279
4,041,434 A 8/1977 Jacobs
4,058,785 A 11/1977 Frind
4,091,353 A 5/1978 Fisk
4,167,723 A * 9/1979 Wilks ..................... H01H 85/42 337/273
5,187,463 A * 2/1993 Di Troia .............. H01H 85/055 337/165
9,893,513 B2 2/2018 Christmann
2016/0141138 A1* 5/2016 Schlaak ................. H01H 69/02 337/231
2017/0345605 A1* 11/2017 Samuels ................ H01H 85/10
2020/0373110 A1* 11/2020 Lell ........................ H01H 85/40

FOREIGN PATENT DOCUMENTS

DE 1463002 A1 * 4/1969

* cited by examiner

*Primary Examiner* — Jacob R Crum
(74) *Attorney, Agent, or Firm* — Baker Botts L.L.P.

(57) ABSTRACT

In one embodiment, a fuse includes a casing, a fuse element housed inside the casing, and one or more arc-quenching-material containers including arc quenching material. Each arc-quenching-material container may be configured proximately to one or more weak spots of the fuse element such that, in an event of an arc, the arc-quenching-material containers are configured to rupture and release the arc quenching material.

20 Claims, 4 Drawing Sheets

FUSE WITH ENCAPSULATED ARC QUENCHING MATERIAL

TECHNICAL FIELD

This disclosure generally relates to the design and manufacture of a fuse with encapsulated arc quenching material.

BACKGROUND

Various liquid filled fuse designs have been produced in the past in an attempt to quench an arc generated in a fuse from being so violent and destructive. Generally, the current fuse designs require the fuse to be completely filled with an arc quenching liquid in order to provide cooling in case of an arc event. However, it may be challenging to make and maintain such fuses due to several problems associated with sealing of the liquid material within the fuse for long term use and storage. It is also wasteful and costly to fill the fuse entirely with the liquid, especially since the arc event that needs to be quenched occurs only locally and therefore much of the surrounding liquid is not put to use.

Accordingly, there is a need to achieve a fuse that permits localized cooling of the arc without completely filling the fuse with liquid.

Further, there is a need for such a fuse that enables high voltage rating without compromising the size of the fuse.

Still further, there is a need for such a fuse that can be constructed in a cost-effective way.

SUMMARY OF PARTICULAR EMBODIMENTS

This disclosure presents a fuse having encapsulated arc quenching material, which may be released proximately to an arcing point during an arcing event and allow localized cooling of the arc. This disclosure moreover presents a method of manufacturing a fuse having an encapsulated arc quenching material.

Electric fuses typically employ a dry quartz sand filler medium used to quench the voltage arc during the fuse interruption process. Dielectric liquids can also provide substantial arc quenching benefits, however the containment of such liquids is problematic and costly. Embodiments disclosed herein provide an encapsulated liquid design and fuse application that deals with the containment and cost challenge.

By encapsulating a dielectric liquid in a glass vial or vessel, the containment of the liquid can be significantly simplified and at a lower cost. These encapsulated liquid vessels are then located inside of a fuse housing and placed adjacent or proximate (e.g., in contact with, or within a close distance) to the fuse elements and in particular adjacent to the fuse element arcing points or weak-spots. When the fuse element operates and the voltage arc is generated the glass vial ruptures and releases its liquid into the arc plasma. The liquid compound may be an oil having hydrogen as a component which will provide a good cooling effect during the high temperature decomposition in the arc plasma. Other beneficial arc suppressing effects generated by the liquid vaporization are the local pressurization of the plasma column and the energy transfer from the liquid phase change.

An embodiment of the fuse comprises a casing of electric insulating material, a fuse element housed inside the casing, and one or more arc-quenching-material containers. The casing comprises two openings, each of which is fitted with a terminal. The fuse element is conductively coupled to two terminals and comprises one or more weak spots. Each arc-quenching-material container comprises arc quenching material and is configured proximately to one or more weak spots.

In particular embodiments, the casing is tubular in structure. In particular embodiments, each of the arc-quenching-material containers is a capillary tube. In particular embodiments, the casing is filled with a sand filler. In particular embodiments, one or more arc-quenching-material containers are configured to rupture and release the arc quenching material during an arc event. In particular embodiments, the arc-quenching-material containers are filled with dielectric liquid. In particular embodiments, the arc-quenching-material containers are configured proximately to one or more weak spots using an adhesive. In particular embodiments, the casing is filled with an arc quenching filler.

An embodiment of a method of manufacturing of the fuse comprises: positioning a fuse element between two terminals—where the fuse element comprises one or more weak spots—conductively coupling the fuse element to the two terminals, configuring one or more arc-quenching-material containers proximately to each of the one or more weak spots, and fitting the two terminals to a casing such that the casing encloses the fuse element and one or more arc-quenching-material containers. The one or more arc-quenching-material containers comprise arc quenching material and are configured to rupture and release the arc quenching material during an arc event.

In particular embodiments, the method further comprises filling the casing with an arc quenching filler. In particular embodiments, the method further comprises filling the casing with a sand filler. In particular embodiments, the arc quenching material is dielectric liquid. In particular embodiments, configuring one or more arc-quenching-material containers proximately to each of one or more weak spots comprises using an adhesive to attach one or more arc-quenching-material containers to each of the one or more weak spots. In particular embodiments, the one or more arc-quenching-material containers are premanufactured as a subassembly. In particular embodiments, the one or more arc-quenching-material containers and the fuse element are premanufactured as a subassembly.

DESCRIPTION OF EXAMPLE EMBODIMENTS

This disclosure presents a fuse with encapsulated arc quenching material. In particular, the fuse according to this disclosure utilizes standalone arc-quenching-material containers (e.g., capillary tubes) that are distinct and separate from the fuse element contained within the fuse. For example, in one embodiment, the standalone arc-quenching-material containers may be manufactured separately from the fuse element, then the standalone arc-quenching-material containers and the fuse element may be coupled to each other by adhesives or mechanical means. In other words, the structures of the arc-quenching-material containers are detached and separate from the fuse element except for the means by which the arc-quenching-material containers are coupled to the fuse element, e.g., an adhesive or mechanical means. Such arc-quenching-material containers may be configured proximately to the weak points of the fuse element, meaning that the arc-quenching-material containers may be configured to be in contact with the weak points or configured in close vicinity to the weak points (e.g., close in distance, but not in contact). The exact distance at which the disclosed arc-quenching-material containers can be configured from the weak points varies depending on the intended use of the fuse, but may still be described as a distance far enough to provide a localized quenching effect in case of an arc event by releasing the arc quenching material within the fuse to reduce the effects of an arc. The design of the arc-quenching-material containers disclosed herein contrasts those of prior art since the arc-quenching-material containers can be manufactured separately from any of the fuse components, thereby making the manufacturing process easier and more cost effective. The benefits provided by the arc-quenching-material containers disclosed herein are monumental given the increased use of fuses in many industries, in particular, the electrical vehicle industry where cost-reduction is highly sought.

Figure 1:
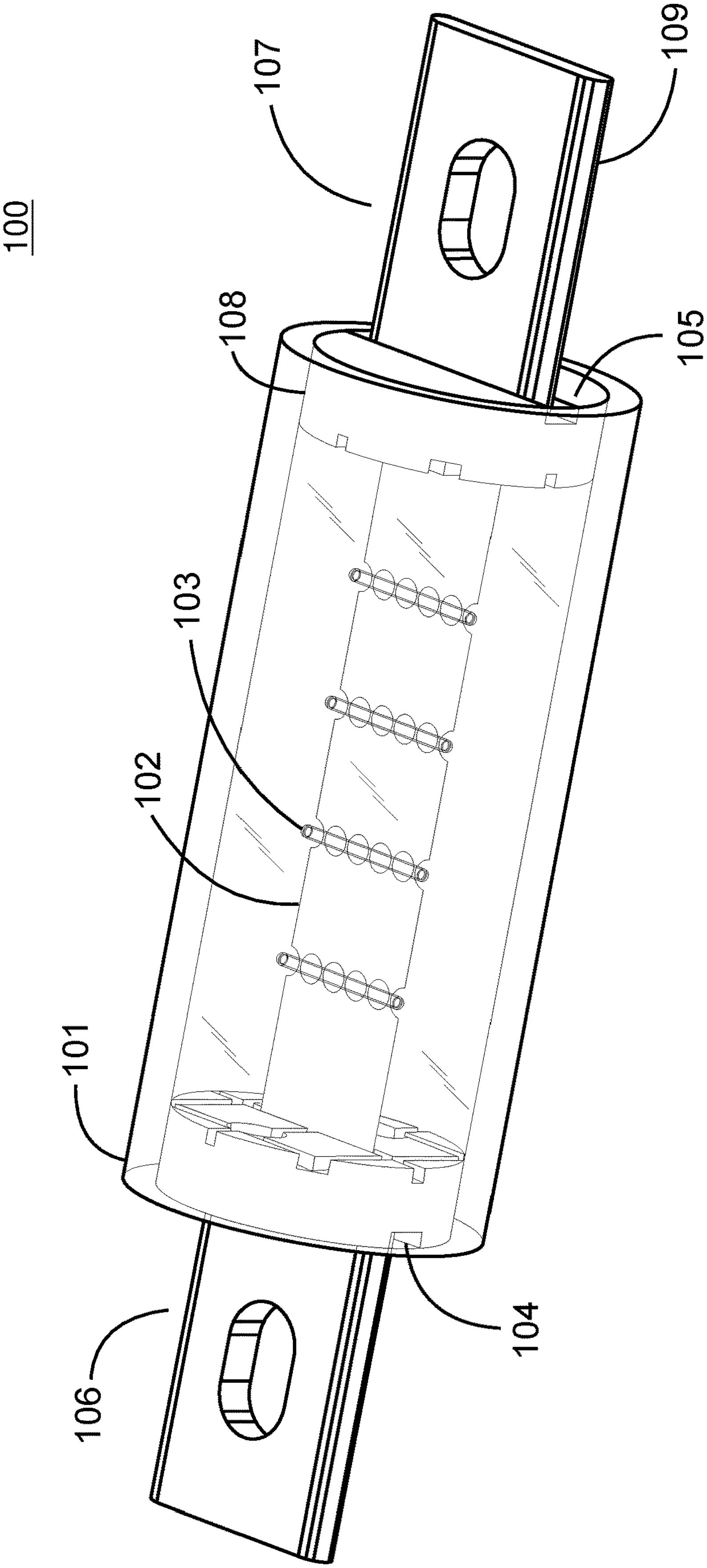
FIG. 1 depicts a perspective view of an embodiment of a fuse according to this disclosure.

FIG. 1 illustrates an embodiment of a fuse 100. In particular embodiments, the fuse 100 may comprise a casing such as a tubular casing 101, a fuse element 102 housed inside the tubular casing 101, and one or more capillary tubes 103 that are configured proximate to the weak spots of the fuse element 102. In particular embodiments, while described as being tubular in structure, the casing may take form of other suitable structures familiar to those skilled in the art. In particular embodiments, the tubular casing 101 may be made of electric insulating materials such as glass or the like suitable for housing various fuse components. In particular embodiments, the tubular casing 101 may comprise two openings 104 and 105, each of which is fitted with a terminal. As an example and not by way of limitation, the terminals 106 and 107 of the fuse 100 may each include a cylindrical portion 108, which may be conductively coupled to the fuse element 102, and an flat end 109, which may allow the fuse 100 to be mechanically connected into an electrical circuit, for example, by means of bolting, clipping, or other connection method familiar to those skilled in the art. While the cylindrical portion 108 and the flat end 109 are described in a particular way and shown as having the shapes depicted in FIG. 1, other suitable shapes and configurations are envisioned. Alternatively or additionally, the terminal may be configured as a fuse cap similar those typically used in medium voltage fuses. In particular embodiments, the tubular casing 101 may be filled with an arc quenching filler. As an example and not by way of limitation, the arc quenching filler may be a sand filler such as quartz sand, liquid filler, or other suitable filler materials that are suitable for the desired voltage and performance of the fuse operation.

While the embodiments disclosed herein may be described using the term capillary tube, other terminology that is suitable for storing arc quenching material may be used interchangeably, for example, an arc-quenching-material container.

Figure 2:
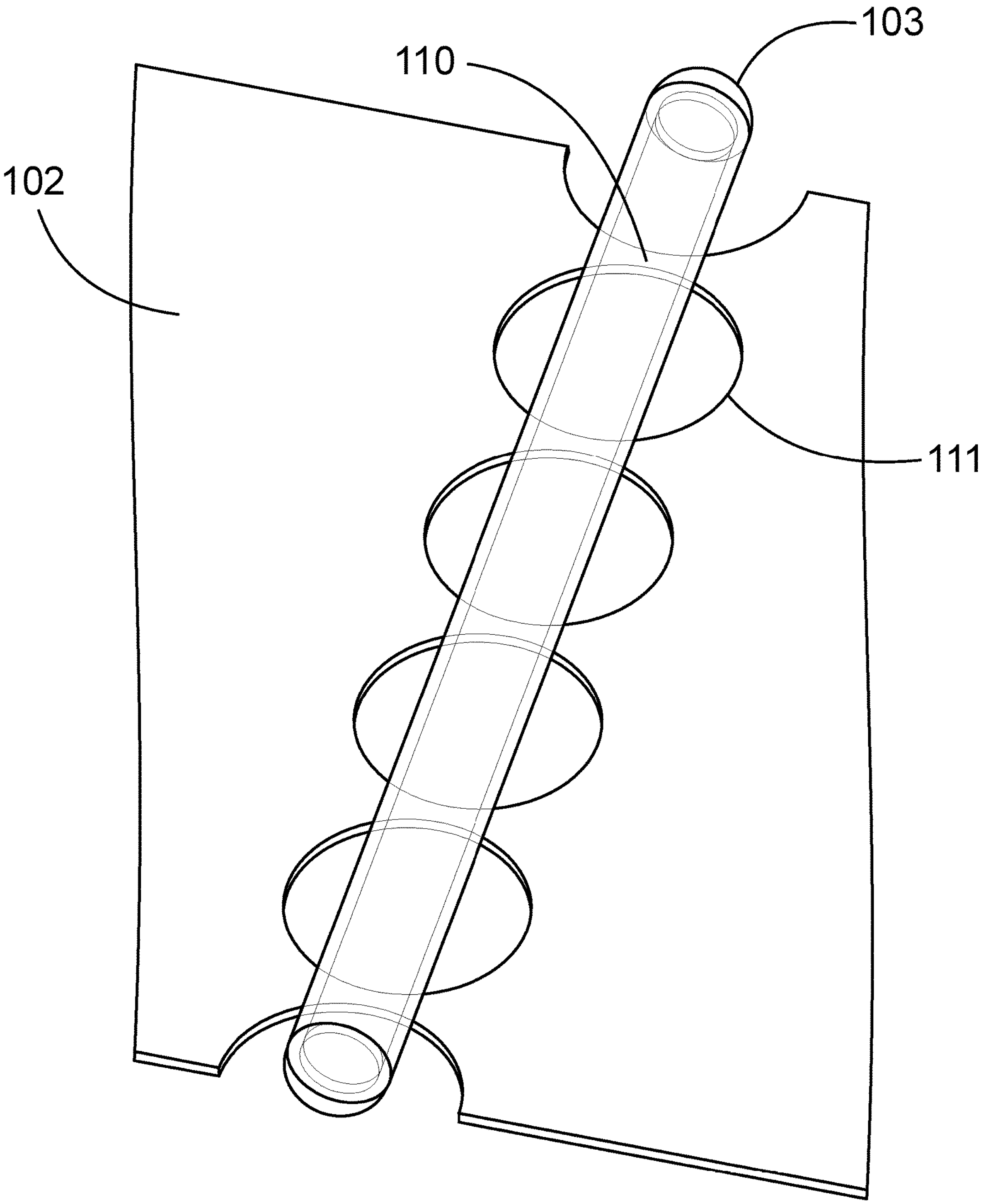
FIG. 2 depicts a perspective view of an embodiment of a capillary tube and one or more weak spots of a fuse element according to this disclosure.

In particular embodiments, the fuse element 102 housed inside the tubular casing 101 may be configured with one or more weak spots 110. With reference to FIGS. 1 and 2, the weak spots 110 are shown to have a cross-sectional area smaller than other portions of the fuse element 102. Weak spots 110 that are configured in such a way are associated with weaker mechanical and/or thermal characteristics than other portions of the fuse element 102, such that when exposed to high current or high temperature, the weak spots 110 are prone to melting. When it melts and disconnects one portion of the fuse element with another, the current flow interrupts and provides overcurrent protection of the electrical circuit by cutting off the electrical flow at that point. As an example and not by way of limitation, as depicted in FIGS. 1 and 2, the weak spots 110 may be formed by configuring apertures 111 in an aligned fashion shown in the fuse element 102. Alternatively, the weak spot may take form as a wire, a strip, or other suitable designs with various orientations and positions with respect to the fuse element for the purpose of performing fuse operations. As an example and not by way of limitation, although not shown, the weak spot may be configured as a metal wire extending along a length of the fuse element, as those typically seen in a traditional type of fuse.

In particular embodiments, as depicted in FIGS. 1 and 2, one or more capillary tubes 103 may be configured proximately to the one or more weak spots 110 of the fuse element 102 and encapsulate arc quenching material. In particular embodiments, the capillary tube 103 may be configured to rupture and release the arc quenching material during an arc event, which may occur around the weak spot 110. As an example and not by way of limitation, as depicted in FIG. 1, each of the capillary tubes 103 may be placed proximate to the weak spots 110, e.g., in a traverse direction on the fuse element 102 and extend across the entire length of the row. In this way, normal fuse operation can be guaranteed even when the weak spots 110 do not all melt simultaneously, for example, when a current level provided is not high enough to instantaneously melt all of the weak spots 110. Although this disclosure describes the placement of the capillary tube in a particular manner, other suitable placements are also contemplated within the scope of this disclosure. As an example and not by way of limitation, in particular embodiments, the capillary tube may be positioned to extend along a length of the fuse element. As another example and not by way of limitation, in particular embodiments, the longitudinal axis of the capillary tube may be positioned at a certain angle with respect to the longitudinal axis of the fuse element.

FIG. 2 illustrates an enlarged view of the example capillary tube 103 of FIG. 1, which is depicted as being positioned along the weak spots 110 of the fuse element 102. In particular embodiments, the capillary tube 103 may be bound to the weak spots 110 by means of adhesive materials, such as silicon adhesive, including sodium silicate, or other suitable adhesive material familiar to those skilled in the art. Alternatively or additionally, the fuse element 102 may be configured next to the capillary tube 103 by means of a mechanical attachment for fixing the capillary tube 103 to the fuse element 102. In particular embodiments, the capillary tube 103 may be made of glass or other suitable materials such that the capillary tube 103 is able to rupture and release the arc quenching material encapsulated therein when exposed to an arc. In particular embodiments, the arc quenching material may include dielectric liquid. As an example and not by way of limitation, the arc quenching material may include cooling gases such as hydrogen, oxygen, fluorine, or the like in the form of liquid. When exposed to high temperature, the arc quenching material may be capable of releasing large amount of gas by means of phase change and decomposition, thereby providing a cooling effect and impeding the ionization of the arc. As an example and not by way of limitation, the arc quenching material may include wax, water, oil, or other suitable materials familiar to those skilled in the art for providing various cooling and arc quenching effects in the event of arcing.

Although the capillary tube 103 is shown as round and cylindrical, other suitable shapes are also contemplated for achieving the desired function of this disclosure. Although described as a capillary tube, other forms of vessel are also contemplated within the scope of this disclosure. As an example and not by way of limitation, a test tube can be used for containing the arc quenching material when a larger fuse or a larger quantity of arc quenching material is needed, provided that the energy of the arc is able to rupture the test tube and liberate the arc quenching material.

Figure 3:
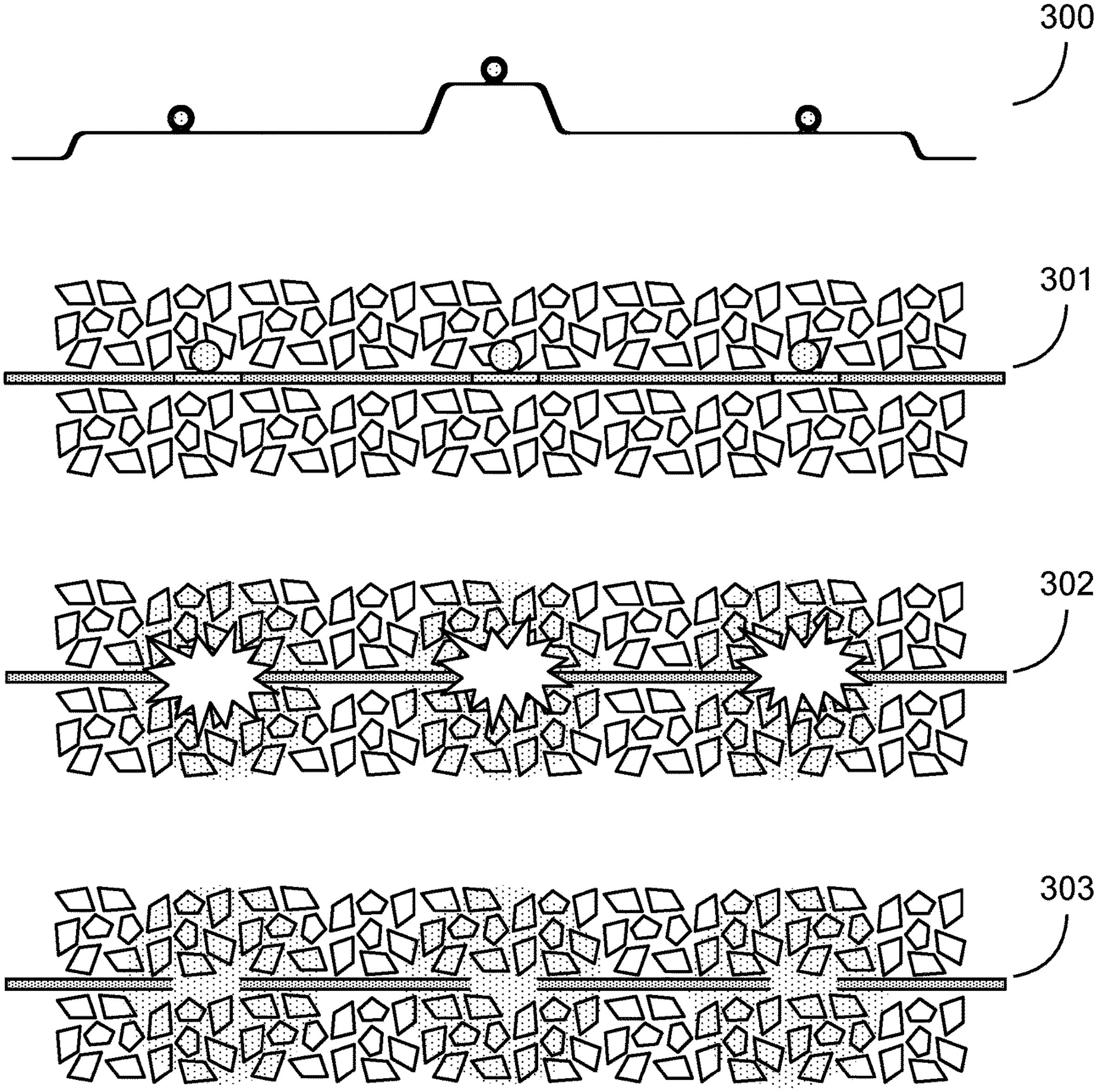
FIG. 3 depicts a cross-sectional view of operation of an embodiment of a fuse according to this disclosure.

FIG. 3 illustrates a cross-sectional depiction on how an example fuse of this disclosure may operate. Initially, during normal fuse operation, as depicted at 300 and 301, the capillary tubes—which are configured proximate to the weak spots of the fuse element—remain intact and preserve the arc quenching material encapsulated therein in a sealed manner. In particular embodiments, the fuse element may be a composite element made of different materials. As an example and not by way of limitation, as more specifically shown at 301, the weak spots of the fuse element may be made of silver while the rest of the fuse element may be made of copper. Alternatively, the weak spots may be made of the same material as the rest of the fuse element. In particular embodiments, the fuse element may take form in a step-like configuration having one or more bends (as depicted at 300). In this way, during normal fuse operation, when the fuse element experiences heating or cooling and undergoes expansion or contraction accordingly, strain effect built upon the weak spots may be relieved. Alternatively, the fuse element may also be flat (as depicted at 301) or other suitable forms familiar to those skilled in the art for supporting fuse performance. As shown in 302, in a scenario where the voltage is high and the temperature of the fuse element rises above its melting point, the weak spots of the fuse element may melt. Thereby, an arc event may occur, causing an arc to appear between the melted ends around the weak spots. The extremely high temperature of such melting, along with the shockwave generated by arcing in small proximity to the capillary tubes, may cause the capillary tubes to rupture and thereafter release the arc quenching material contained within the capillary tubes. As shown in 303, the released arc quenching material, when exposed to the arc, may vaporize and decompose under high temperature. In particular embodiments, when the arc quenching material is laden with certain quenching elements such as hydrogen, it can liberate those elements in the form of gases and provide a cooling or re-ionization effect for the arc. Specifically, as an example and not by way of limitation, the gases may impede ionization of the plasma that conducts electrons in the arc and interrupt ionic flow, thereby preventing the arc from growing too large. Thereafter, the remaining arc quenching material may further be dispersed into the arc quenching filler surrounding the fuse element.

In this way, the fuse in accordance with this disclosure can advantageously reduce the arc energy and contain the arc within the fuse in a controllable manner. Size of the fuse may potentially be reduced while maintaining the desired fuse performance. Moreover, because the fuse can now control the arc through the localized cooling effect, voltage rating on the fuse can be increased. This may be especially beneficial in the field of electric vehicles where a higher voltage fuse is needed without sacrificing the size or weight of the fuse. This may also be useful in DC applications, where the voltage potential remains high, and much more aggressive arcs may be generated. Furthermore, during the vaporization of the arc quenching material, local pressure around the arc may be increased, thus helping to compress the arc and generate arc voltage faster, which provides an even further desirable performance metric for the fuse.

The technical advantages explained above are meant only as an example and not as a limitation. Certain embodiments disclosed herein may provide none, some, or all of the above technical advantages. One or more other technical advantages may be readily apparent to one skilled in the art in view of the figures, descriptions, and claims of this disclosure.

Figure 4:
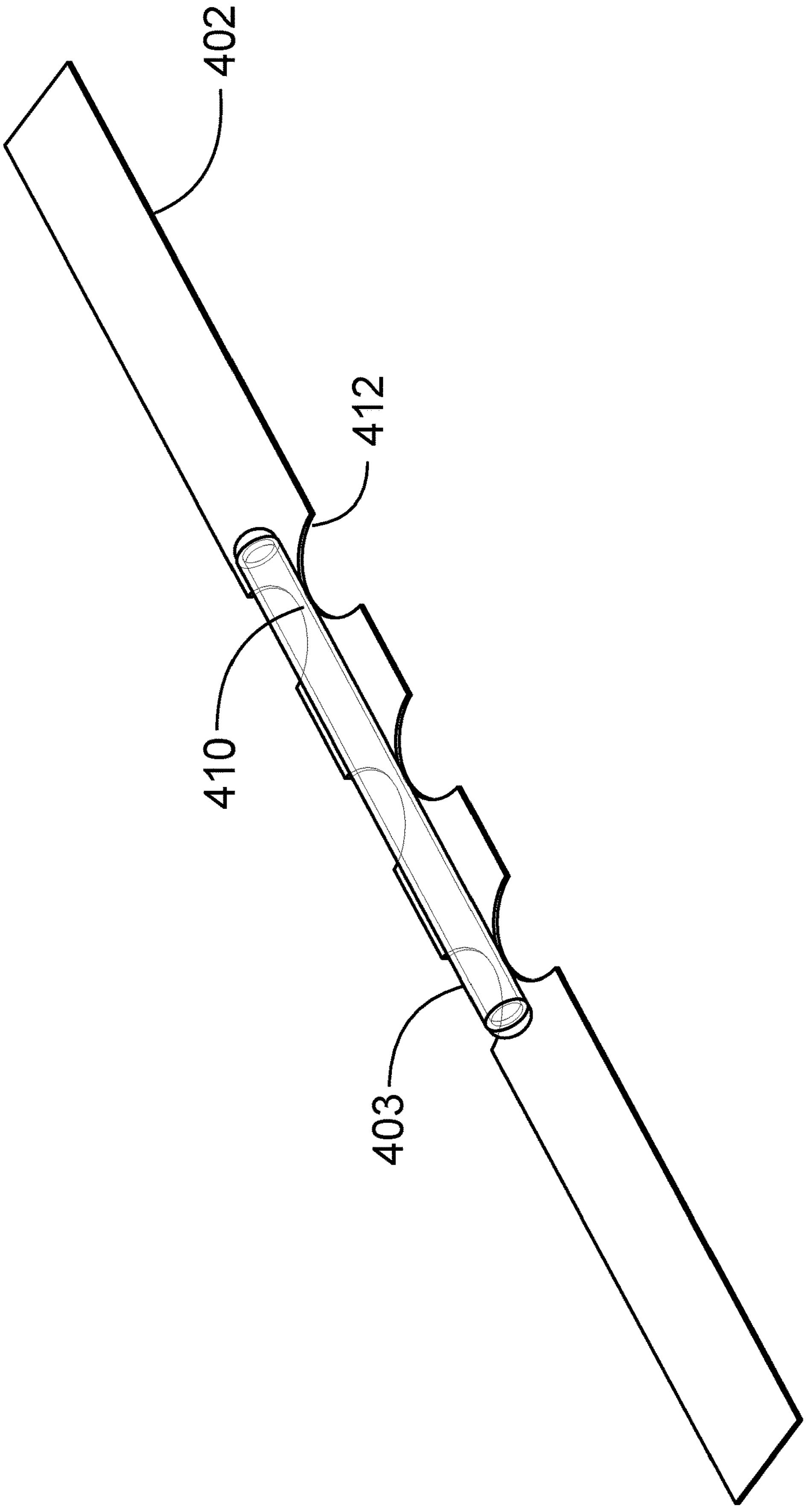
FIG. 4 depicts a perspective view of another embodiment of a capillary tube and one or more weak spots of a fuse element according to this disclosure.

FIG. 4 depicts another embodiment of a capillary tube and one or more weak spots of a fuse element. In particular embodiments, as depicted in FIG. 4, the fuse element 402 may comprise multiple weak spots 410 arranged in series along a length of the fuse element 402. As an example and not by way of limitation, the weak spots 410 may be configured by providing multiple recesses 412 along both sides of the fuse element such that the weak spots 410 formed in between the recesses 412 may have smaller cross-sectional areas than the rest of the fuse element 402. In particular embodiments, as depicted in FIG. 4, a capillary tube 403 may be positioned across the series of weak spots 410 along a length of the fuse element 402. As an example and not by way of limitation, the capillary tube 403 may be in close contact with the weak spots 410 such that, during an arcing event around the weak spots 410, the energy of the arc is able to rupture the capillary tube 403.

Although this disclosure describes the capillary tube and the weak spot in a particular manner, other suitable configurations of the capillary tube and the weak spot are also contemplated by this disclosure. As an example and not by way of limitation, although not shown, the fuse element may be provided with a weak spot in the form of a metal wire. For example, a body portion of the metal wire may be sealed, together with an arc quenching liquid, within a capillary tube, while end portions of the metal wire may extend outside of the capillary tube and be coupled to the rest of the fuse element to enable electrical conduction. In this way, possibility of liquid leakage can be reduced, and construction of the fuse can be simplified.

In particular embodiments, the capillary tubes and the weak spots may be in proximity to each other such that the capillary tubes are essentially in contact with the weak spots. Alternatively, the capillary tubes may be separate from the weak spots by a distance small enough for the capillary tubes to be ruptured in case of an arc event that occurs around the weak spots. Accordingly, the capillary tubes may release the arc quenching material contained therein, such that the fuse of this disclosure can provide a localized cooling effect for the arc, without completely filling the fuse with liquid. Moreover, the capillary tubes may be produced in mass and manufactured inexpensively because of their standalone design (e.g., separate from components of the fuse element) while still providing the desired arc quenching effect in a sufficient manner.

The method of manufacturing an embodiment of a fuse according to this disclosure is described primarily in conjunction with FIG. 1. Details that are familiar to those skilled in the art are not described in exhaustive details.

In an example manufacture process of the fuse 100 as depicted in FIGS. 1 and 2, the fuse element 102 may be configured with one or more weak spots 110. As an example and not by way of limitation, the fuse element 102, initially taking the form of a thin foil having a thickness on the degree of thousandths of an inch, for example, can be made with one or more weak spots 110 during a stamping process. As an example and not by way of limitation, multiple apertures 111 arranged in rows, the rows being in parallel with each other, can be punched through the fuse element 102 to form weak spots 110 having relatively small cross-sectional areas. Although not shown, other configurations of the weak spot are also contemplated, such as elongated weak spot, for providing a weaker mechanical and/or thermal characteristic than other portions of the fuse element. Additionally, in the stamping process, the fuse element can be formed in a step-like configuration having one or more bends, as depicted in FIG. 3. In doing so, the bend of the fuse element may reduce the strain effect and mechanical fatigue on the weak spots, which may be caused by heating or cooling of the fuse element during normal fuse operation.

Subsequently, in particular embodiments, the fuse element 102 can be coupled to the terminals 106, 107 of the fuse 100 in a conductive manner, for example, by means of heating and/or soldering. In particular embodiments, a C frame fixture can be used. As an example and not by way of limitation, two terminals 106, 107 of the fuse 100 can be bolted into the C frame fixture at a proper spacing apart from each other. The tubular casing 101 of the fuse 100 can be slipped over one end of the C frame fixture and positioned away from the two terminals 106, 107 in the axial direction, in order to provide a free access to the terminals 106, 107 for the soldering process. Subsequently, the fuse element 102 comprising the weak spots 110 can be brought in place into the spacing between the two terminals 106, 107. As an example and not by way of limitation, the cylindrical portion 108 of each of the terminals 106, 107 may include a groove or similar structure for receiving the fuse element 102 such that the fuse element 102 is able to span the groove freely without any further support. Thereafter, the cylindrical portion 108 can be heated, for example, by resistive heating, induction heating, or other heating operation familiar to those skilled in the art. Solder material can then be introduced into the grooves in the soldering process so as to achieve permanent electrical connection of the fuse element 102 to the terminals 106, 107. Of course, other suitable process can also be applied for conductively coupling the fuse element to the terminals without departing from the scope of this disclosure.

In particular embodiments, one or more capillary tubes 103 comprising arc quenching material can be placed proximately to one or more weak spots 110 of the fuse element 102. For example, the capillary tubes may be configured right next to the weak spots, such that the capillary tubes are essentially in contact with the weak spots. Alternatively, the capillary tubes may be configured near but without being in contact with the weak spots, that is, the capillary tubes may be configured at a particular distance away from the weak spots but close enough for the capillary tubes to be ruptured during an arc event. In particular embodiments, the arc quenching material may be encapsulated within the capillary tubes in a sealed manner, such as by means of an adhesive, heat seal, or the like. As an example and not by way of limitation, the capillary tube containing the arc quenching material can be manufactured in mass and produced inexpensively as a subassembly, such that it can be readily available for use in subsequent fuse manufacturing process, which may include the steps of, for example, attaching, gluing, soldering, or otherwise configuring the capillary tube proximately to the fuse element. In doing so, low-cost construction of the fuse can be achieved. Alternatively or additionally, the capillary tube together with the fuse element can be premanufactured as a subassembly and then undergo the similar soldering process as described above. As an example and not by way of limitation, the capillary tube can be placed proximately to the weak spot using an adhesive, such as silicon adhesive, including sodium silicate, or other suitable adhesive material familiar to those skilled in the art, for the purpose of binding the capillary tube to the weak spot. Alternatively or additionally, mechanical structures can be provided for holding the capillary tube in place. As an example and not by way of limitation, the fuse element may be configured with a mechanical structure, such as a bend or the like, during the stamping operation, to mechanically hold the capillary tube in proximity to one or more weak spots. Because both the capillary tube and the arc quenching material can be made of relatively cheap materials and applied to the fuse element in a cost-effective way, desired functions of the fuse of this disclosure can be achieved without interfering with the basic low manufacture cost of the fuse.

After the fuse element 102 and the capillary tube 103 are in place, in particular embodiments, the tubular casing 101 can be slid back into a position between the two terminals 106, 107, as depict in FIG. 1, and fitted to the terminals 106, 107. In particular embodiments, one or more holes can be drilled through the tubular casing 101 and the cylindrical portions 108 of the terminals 106, 107. As an example and not by way of limitation, each of the cylindrical portions 108 can be drilled with four holes at 90 degrees apart from each other in the radial direction. In particular embodiments, a metal pin, such as a steel pin, can be drove into each hole so that the metal pins are able to enter into the cylindrical portion 108 of the terminals 106, 107. Additionally, the metal pins, once in place, can stay flush with an outer surface of the tubular casing 101, thus fitting the terminals 106, 107 to the tubular casing 101. Although this disclosure describes fitting of the terminal by means of drilling and pinning, this disclosure contemplates such fitting in any suitable manner. At this point, various components of the fuse are completely locked tight together mechanically, and the fuse 100 are well assembled and, for example, can be removed from the C frame fixture.

Manufacture of the fuse may further include additional steps. Optionally, in particular embodiments, after the fuse is completely assembled and, for example, removed from the C frame fixture, the tubular casing 101 of the fuse can be further filled with arc quenching filler. As an example and not by way of limitation, the cylindrical portion 108 of the terminal may be configured with a through hole for receiving the arc quenching filler, such as sand filler. For example, the sand filler can be poured vertically through the through hole in a sand filling machine, thus filling the tubular casing 101. The sand filler can then be compacted by means of vibration or gravitation or other procedure, such that the fuse element 102 and the capillary tubes 103 are completely surrounded by the compacted sand filler. Finally, a plug can be provided to close the through hole and seal the sand filler within the tubular casing 101.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A fuse comprising:

a casing of electric insulating material comprising two openings, wherein each of the two openings is fitted with a terminal;

a fuse element housed inside the casing, wherein the fuse element is conductively coupled to the two terminals, wherein the fuse element comprises two or more series of weak spots; and two or more arc-quenching-material containers, wherein a length of each arc-quenching-material container extends along a length of one series of the two or more series of weak spots, wherein arc quenching material is encapsulated within each of the two or more arc-quenching-material containers and is not in contact with the fuse element, and wherein each of the two or more arc-quenching-material containers is located within a pre-determined distance from a corresponding series of weak spots of the two or more series of weak spots such that the arc quenching material within the arc-quenching-material container is released into the corresponding series of weak spots when the arc-quenching-material container ruptures.

2. The fuse of claim 1, wherein the casing is tubular in structure.

3. The fuse of claim 1, wherein each of the arc-quenching-material containers is a capillary tube.

4. The fuse of claim 1, wherein the casing is filled with a sand filler.

5. The fuse of claim 1, wherein the two or more arc-quenching-material containers are configured to rupture and release the arc quenching material during an arc event.

6. The fuse of claim 1, wherein the two or more arc-quenching-material containers are filled with dielectric liquid.

7. The fuse of claim 1, wherein the two or more arc-quenching-material containers are configured proximately to the two or more series of weak spots using an adhesive.

8. The fuse of claim 1, wherein the casing is filled with an arc quenching filler.

9. The fuse of claim 1, wherein the two or more arc-quenching-material containers are detached and separate from the fuse element.

10. A method of manufacturing a fuse, the method comprising:

positioning a fuse element between two terminals, wherein the fuse element comprises two or more series of weak spots;

conductively coupling the fuse element to the two terminals;

configuring two or more arc-quenching-material containers proximately to the two or more series of weak spots, wherein a length of each arc-quenching-material container extends along a length of one series of the two or more series of weak spots, wherein arc quenching material is encapsulated within each of the two or more arc-quenching-material containers and not in contact with the fuse element, and wherein each of the two or more arc-quenching-material containers is located within a pre-determined distance from a corresponding series of weak spots of the two or more series of weak spots such that the arc quenching material within the arc-quenching-material container is released into the corresponding series of weak spots when the arc-quenching-material container ruptures; and fitting the two terminals to a casing such that the casing encloses the fuse element and the two or more arc-quenching-material containers.

11. The method of claim 10, further comprising filling the casing with an arc quenching filler.

12. The method of claim 10, further comprising filling the casing with a sand filler.

13. The method of claim 10, wherein the arc quenching material is dielectric liquid.

14. The method of claim 10, wherein configuring the two or more arc-quenching-material containers proximately to the two or more series of weak spots comprises using an adhesive to attach the one or more arc-quenching-material containers to the one or more series of weak spots.

15. The method of claim 10, wherein the two or more arc-quenching-material containers are premanufactured as a subassembly.

16. The method of claim 10, wherein the two or more arc-quenching-material containers and the fuse element are premanufactured together as a subassembly.

17. The method of claim 10, wherein the two or more arc-quenching-material containers are detached and separate from the fuse element.

18. The fuse of claim 1, wherein the two or more arc-quenching-material containers are in contact with the two or more series of weak spots.

19. The fuse of claim 1, wherein the two or more arc-quenching-material containers are on top of the two or more series of weak spots.

20. The fuse of claim 1, wherein the fuse element housed inside the casing is a single fuse element.

* * * * *